United States Patent
Li et al.

(10) Patent No.: US 11,763,453 B1
(45) Date of Patent: Sep. 19, 2023

(54) AUTOMATIC GENERATION METHOD OF FINE-LABELED DIGITAL PATHOLOGICAL DATA SET BASED ON HYPERSPECTRAL IMAGING

(71) Applicant: East China Normal University, Shanghai (CN)

(72) Inventors: Qingli Li, Shanghai (CN); Jiansheng Wang, Shanghai (CN)

(73) Assignee: EAST CHINA NORMAL UNIVERSITY, Shanghai (CN)

( * ) Notice: Subject to any disclaimer, the term of this patent is extended or adjusted under 35 U.S.C. 154(b) by 0 days.

(21) Appl. No.: 18/107,567

(22) Filed: Feb. 9, 2023

(30) Foreign Application Priority Data

Mar. 16, 2022 (CN) .......................... 202210259318.6

(51) Int. Cl.
G06T 7/00 (2017.01)
G06T 7/11 (2017.01)
(Continued)

(52) U.S. Cl.
CPC .............. G06T 7/0012 (2013.01); G06T 5/50 (2013.01); G06T 7/11 (2017.01); G06V 10/46 (2022.01);
(Continued)

(58) Field of Classification Search
CPC . G06T 7/0012; G06T 5/50; G06T 7/11; G06T 2207/10024; G06T 2207/10036;
(Continued)

(56) References Cited

U.S. PATENT DOCUMENTS

2019/0252075 A1  8/2019  Schmidt
2020/0258223 A1*  8/2020  Yip ...................... G06T 7/0012
(Continued)

FOREIGN PATENT DOCUMENTS

CN     108629768 A     10/2018
CN     108765408 A     11/2018
(Continued)

OTHER PUBLICATIONS

Liu et al. "The Generation of Virtual Immunohistochemical Staining Images Based on an Improved Cycle—GAN." Machine Learning and Intelligent Communications, LNICST, vol. 342, 2020, pp. 137-147 (Year: 2020).*
(Continued)

Primary Examiner — Jon Chang
(74) Attorney, Agent, or Firm — Pilloff Passino & Cosenza LLP; Rachel Pilloff; Martin J. Cosenza (57) ABSTRACT

Disclosed is an automatic generation method of a fine-labeled digital pathological data set based on hyperspectral imaging, comprising following steps: obtaining reference histological stained slides and double-stained slides based on pathological samples; obtaining two-dimensional color reference whole slide images based on the reference histological stained slides, and obtaining double-stained hyperspectral images based on the double-stained slides; establishing virtual staining models based on the two-dimensional color reference whole slide images and the double-stained hyperspectral images; establishing a segmentation model for automatically generating labeling information based on the double-stained hyperspectral images; and obtaining the fine-labeled digital pathological data set based on the double-stained hyperspectral images and the virtual staining models, the double-stained hyperspectral images and the segmentation model.

6 Claims, 5 Drawing Sheets

(51) Int. Cl.
  *G06T 5/50* (2006.01)
  *G06V 10/46* (2022.01)
(52) U.S. Cl.
  CPC .............. *G06T 2207/10024* (2013.01); *G06T 2207/10036* (2013.01); *G06T 2207/10056* (2013.01); *G06T 2207/20221* (2013.01); *G06T 2207/30024* (2013.01); *G06T 2207/30096* (2013.01)
(58) Field of Classification Search
  CPC . G06T 2207/10056; G06T 2207/20221; G06T 2207/30024; G06T 2207/30096; G06V 10/46
  See application file for complete search history.

(56) References Cited

U.S. PATENT DOCUMENTS

| | | | | |
|---|---|---|---|---|
| 2022/0108446 | A1* | 4/2022 | Sainson | G06T 7/0012 |
| 2023/0030424 | A1* | 2/2023 | Ozcan | G06V 10/82 |

FOREIGN PATENT DOCUMENTS

| | | |
|---|---|---|
| CN | 109061131 A | 12/2018 |
| CN | 110088804 A | 8/2019 |
| CN | 110838094 A | 2/2020 |
| CN | 111539883 A | 8/2020 |
| CN | 111819569 A | 10/2020 |
| CN | 111986150 A | 11/2020 |
| CN | 112106061 A | 12/2020 |
| CN | 112543934 A | 3/2021 |
| CN | 113256617 A | 8/2021 |
| WO | WO-2021198252 A1 * | 10/2021 |

OTHER PUBLICATIONS

Xu et al. "GAN-based Virtual Re-Staining: A Promising Solution for Whole Slide Image Analysis." Biology, ArXiv 1901.04059 [cs.CV], Jan. 13, 2019, pp. 1-16 (Year: 2019).*
Jose et al. "Generative Adversarial Networks in Digital Pathology and Histopathological Image Processing: A Review." Journal of Pathology Informatics, 12:43, Nov. 3, 2021, pp. 1-11 (Year: 2021).*
Mao, et al. "Single Generative Networks for Stain Normalization and Quality Enhancement of Histological Images in Digital Pathology" 2021 14th International Congress on Image and Signal Processing, BioMedical Engineering and Informatics (CISP-BMEI).

* cited by examiner

AUTOMATIC GENERATION METHOD OF FINE-LABELED DIGITAL PATHOLOGICAL DATA SET BASED ON HYPERSPECTRAL IMAGING

CROSS-REFERENCE TO RELATED APPLICATIONS

This present application claims priority to Chinese Patent Application No. 202210259318.6, filed on Mar. 16, 2022, the contents of which are hereby incorporated by reference.

TECHNICAL FIELD

The application belongs to the technical field of digital image processing, and in particular relates to an automatic generation method of a fine-labeled digital pathological data set based on hyperspectral imaging.

BACKGROUND

Histopathology is the "gold standard" in the diagnosis of tumor diseases. It not only determines the range of tumor resection and the degree of tumor infiltration before operation, but also provides indispensable information for clinical treatment and prognosis. At present, due to the difference of staining technology and imaging system, the histological staining of pathological images from different sources is obviously different, and the labeling information in pathological data sets needs to be manually completed by professionals, which is a heavy workload, laborious, time-consuming and error-prone. However, in computer-aided diagnosis, the deep learning algorithm relies on large-scale pathological data sets and accurate labeling information. The existing manual labeling data sets are scarce and small in scale, and the accuracy and robustness of the deep learning algorithm in identifying and analyzing results are not enough to meet the needs of actual diagnosis. At the same time, at present, a large number of researches are based on ordinary microscope images, and the amount of information is limited, so it is impossible to obtain tumor features from other dimensions except the spatial dimension, which also limits the research of difficult automatic labeling methods.

SUMMARY

In order to solve the above technical problems, the present application provides an automatic generation method of a fine-labeled digital pathological data set based on hyperspectral imaging, which is accurate, efficient, intelligent and reliable, and is helpful to provide large-scale fine-labeled digital pathological data sets for deep learning algorithms.

In order to achieve the above objectives, the present application provides the automatic generation method of a fine-labeled digital pathological data set based on hyperspectral imaging, which includes the following steps:

obtaining reference histological stained slides and double-stained slides based on pathological samples;

obtaining two-dimensional color reference whole slide images based on the reference histological stained slides, and obtaining double-stained hyperspectral images based on the double-stained slides;

establishing virtual staining models based on the two-dimensional color reference whole slide images and the double-stained hyperspectral images;

establishing labeling information segmentation models based on the double-stained hyperspectral images; and obtaining the fine-labeled digital pathological data set based on the double-stained hyperspectral images and the virtual staining models, the double-stained hyperspectral images and the labeling information segmentation models.

Optionally, obtaining the reference histological stained slides and the double-stained slides includes following steps:

obtaining pathological slides based on the pathological samples;

staining the pathological slides based on hematoxylin-eosin to obtain the reference histological stained slides; and staining the pathological slides based on the hematoxylin-eosin and the immunohistochemical marker to obtain the double-stained slides.

Optionally, obtaining the two-dimensional color reference whole slide images includes: using a whole slide scanner to carried out a magnified field of view collection on the reference histological stained slides to obtain the two-dimensional color reference whole slide images.

Optionally, obtaining the double-stained hyperspectral images includes following steps:

obtaining three-dimensional microscopic hyperspectral images and blank hyperspectral images based on the double-stained slides;

preprocessing the three-dimensional microscopic hyperspectral images and the blank hyperspectral images to obtain the double-stained hyperspectral images.

Optionally, obtaining the three-dimensional microscopic hyperspectral images and the blank hyperspectral images includes: using a hyperspectral microscope to carry out a magnified single-field of view collection on the double-stained slides, where images containing biological tissues are collected to obtain the three-dimensional microscopic hyperspectral images, and blank images without any biological tissue are collected to obtain the blank hyperspectral images.

Optionally, preprocessing the three-dimensional microscopic hyperspectral images and the blank hyperspectral images includes: performing a floating-point operation of division on the three-dimensional microscopic hyperspectral images and the blank hyperspectral images by using a spectral normalization method.

Optionally, establishing the virtual staining models includes following steps:

establishing hyperspectral cycle generative adversarial networks;

obtaining pseudo-color composite images based on the double-stained hyperspectral images;

training the hyperspectral cycle generative adversarial networks based on the two-dimensional color reference whole slide images and the pseudo-color composite images to obtain the virtual staining models.

Optionally, the hyperspectral cycle generative adversarial networks include two generators and two discriminators.

The two generators are provided with encoders, transcoders and decoders.

The encoders include three downsampling layers, the transcoders include nine residual blocks, and the decoders include three upsampling layers.

The two discriminators each include a plurality of downsampling layers.

Optionally, establishing the labeling information segmentation models includes following steps:

performing image segmentation processing on the double-stained hyperspectral images based on a gradient boosting decision tree and a graph cut algorithm to obtain a binary image of a tumor region of interest;

obtaining labeling files required by the pathological data set by extracting an outer contour of the binary image, and completing establishing the labeling information segmentation models.

Optionally, obtaining the fine-labeled digital pathological data set includes following steps:

inputting the double-stained hyperspectral images into the virtual staining model to obtain a color reference stained image;

inputting the double-stained hyperspectral image into the labeling information segmentation models to obtain labeling information;

forming the fine-labeled digital pathological data set based on the color reference stained image and the labeling information.

Compared with the prior art, the application has the following advantages and technical effects.

According to the automatic generation method of the fine-labeled digital pathological data set based on hyperspectral imaging, the hyperspectral image data stained by two stains at the same time are subjected to staining inversion and target segmentation, and the staining inversion is related to the generation of pathological images stained by standard hematoxylin-eosin, which is helpful to remove the staining differences of pathological slides from different sources. Furthermore, the target segmentation is related to the generation of the labeling files of the tumor region, and the binarization result of the tumor region of interest is extracted by the "graph-spectral integration" segmentation method, and binarization result is converted into labeling files, thus solving the problem of manual labeling. The method provided by the application is accurate, efficient, intelligent, reliable, and is helpful to provide large-scale fine-labeled digital pathological data sets for deep learning algorithms.

BRIEF DESCRIPTION OF THE DRAWINGS

The drawings that form a part of this application are used to provide a further understanding of this application. The illustrative embodiments of this application and their descriptions are used to explain this application, and do not constitute undue limitations on this application. In the attached drawings.

DETAILED DESCRIPTION OF THE EMBODIMENTS

It should be noted that the embodiments in this application and the features in the embodiments may be combined with each other without conflict. The application will be described in detail with reference to the drawings and embodiments.

It should be noted that the steps shown in the flow charts of the drawings may be executed in a computer system such as a set of computer-executable instructions, and although a logical sequence is shown in the flow charts, in some cases, the steps shown or described may be executed in a sequence different from that here.

Embodiments

Figure 1:
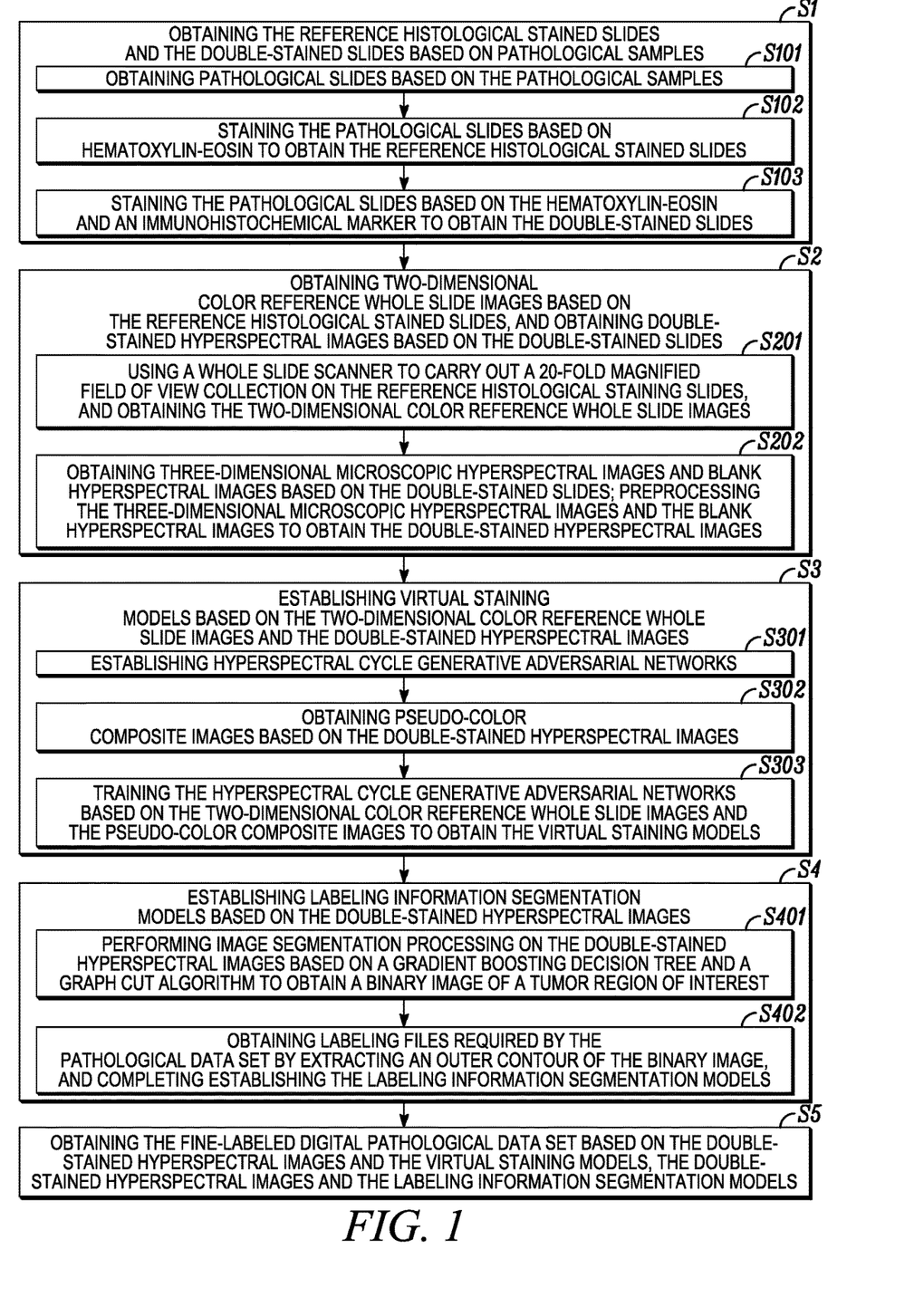
FIG. 1 is a flow chart of an automatic generation method of a fine-labeled digital pathological data set based on hyperspectral imaging according to an embodiment of the present application.

As shown in FIG. 1, this embodiment provides an automatic generation method of a fine-labeled digital pathological data set based on hyperspectral imaging, including following steps:

S1, obtaining the reference histological stained slides and the double-stained slides based on pathological samples;

S101, obtaining pathological slides based on the pathological samples;

S102, staining the pathological slides based on hematoxylin-eosin to obtain the reference histological stained slides;

S103, staining the pathological slides based on the hematoxylin-eosin and an immunohistochemical marker to obtain the double-stained slides.

Further, in this embodiment, above steps are as follows:

obtaining the pathological samples by biopsy, and preparing two batches of pathological slides respectively:

first, staining all samples with the hematoxylin-eosin (H&E) for standard histological staining, and obtaining the stained slides Slide (N), dividing Slide (N) into Slide (N1) and Slide (N2), and taking the Slide (N1) as the reference histological staining slides;

staining another batch of Slide (N2) with the immunohistochemical marker CAMS 0.2 dye, and obtaining the double-stained slides DoubleStain (N2).

S2, obtaining two-dimensional color reference whole slide images based on the reference histological stained slides, and obtaining double-stained hyperspectral images based on the double-stained slides;

S201, using a whole slide scanner to carry out a 20-fold magnified field of view collection on the reference histological staining slides, and obtaining the two-dimensional color reference whole slide images;

S202, obtaining three-dimensional microscopic hyperspectral images and blank hyperspectral images based on the double-stained slides; preprocessing the three-dimensional microscopic hyperspectral images and the blank hyperspectral images to obtain the double-stained hyperspectral images.

A hyperspectral microscope is used to carry out a magnified single-field of view collection on the double-stained slides, where images containing biological tissues are collected to obtain the three-dimensional microscopic hyperspectral images, blank images without any biological tissue are collected to obtain the blank hyperspectral images and a floating-point operation of division is performed on the three-dimensional microscopic hyperspectral images and the blank hyperspectral images by using a spectral normalization method.

Further, in this embodiment, above steps are specifically as follows:

using the whole slide scanner to carry out the 20-fold magnified field of view collection on the reference histological staining slides Slide (N1), and obtaining the two-dimensional color reference whole slide images ColorWSI (x,y);

using the hyperspectral microscope to carry out the 20-fold magnified single-field of view collection on the double-stained slides DoubleStain (N2), where the images containing biological tissues are valid images HyperData (m, n, λ), namely the three-dimensional microscopic hyperspectral images, with a wavelength range of 380 nm-800 nm, and the number of bands of 60 and the blank images without any biological tissue are invalid image Blank (m, n, λ), namely the blank hyperspectral images;

reading in the original three-dimensional microscopic hyperspectral images data HyperData (m, n, λ) and blank hyperspectral images Blank (m, n, λ), and performing the floating-point operation of division wavelength by wavelength and pixel by pixel in each two-dimensional field of view to preprocess by using the spectral normalization method, that is the three-dimensional microscopic hyperspectral data HyperData (m, n, λ) is divided by the blank hyperspectral images Blank (m, n, λ), so as to obtain the double-stained hyperspectral images after elimination of an optical path and system noise.

S3, establishing virtual staining models based on the two-dimensional color reference whole slide images and the double-stained hyperspectral images;

S301, establishing hyperspectral cycle generative adversarial networks;

S302, obtaining pseudo-color composite images based on the double-stained hyperspectral images;

S303, training the hyperspectral cycle generative adversarial networks based on the two-dimensional color reference whole slide images and the pseudo-color composite images to obtain the virtual staining models.

Figure 2:
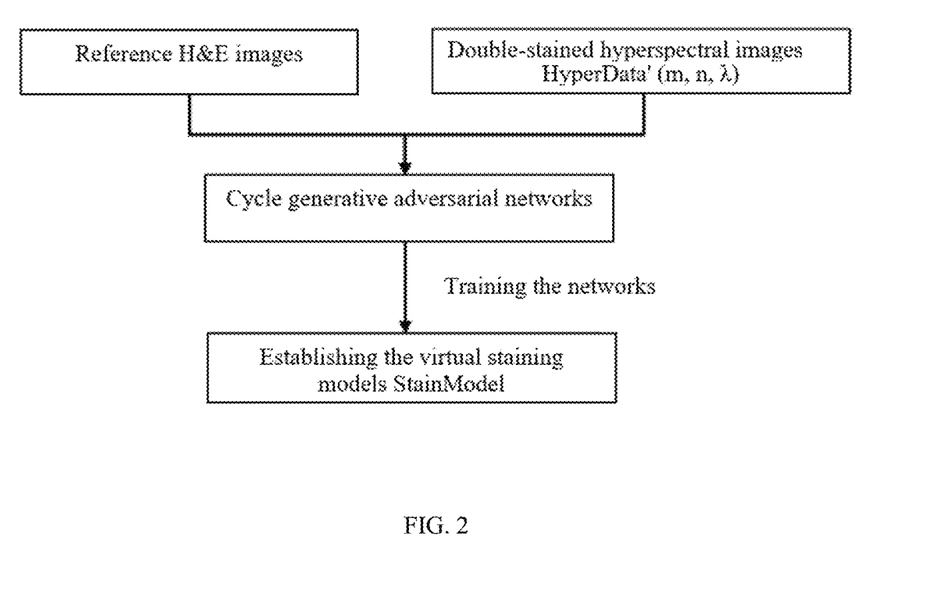
FIG. 2 is a flow chart of establishing virtual staining models according to an embodiment of the present application.

Further, in this embodiment, the constructed hyperspectral cycle generative adversarial networks based on spatial spectrum information includes two generators, namely generators G1 and G2, and two discriminators, namely discriminators D1 and D2.

The generators G1 and G2 are provided with encoders, transcoders and decoders and the encoders, the transcoders and the decoders are implemented by three downsampling layers, nine Residual Blocks and three upsampling layers respectively. A convolution kernel size of a first layer of the downsampling layers of the encoders is 7×7, and convolution kernels of the last two layers are 3×3. After convolution of each layer, a Spatial Batch Normalization is added for normalization and a rectified linear unit (ReLU) as a nonlinear function is used as an activation function. Convolution kernel sizes in the upper-sampling layers are 3×3. After deconvolution, each layer is normalized by adding the Spatial Batch Normalization. The first two layers adopt the ReLU function as activation functions, and a last output layer adopts tanh as an activation function.

The discriminators D1 and D2 are provided with a series of downsampling layers, and a size of an input image is unlimited. After each layer, Spatial Batch Normalization is added for normalization and LeakyReLU function is used as an activation function, and a last output layer is added with offset parameters. Firstly, three bands are extracted from the double-stained hyperspectral images HyperData' (m, n, λ) by a band selection method for pseudo-color synthesis, and the pseudo-color composite images PsudoData (m, n, λ) are obtained.

Secondly, two input channels of the network generator G1 are respectively put into the color reference whole slide image ColorWSI (x,y) and pseudo-color double-stained hyperspectral image PsudoData (m, n, λ), with the size of the input image of 512×512 pixels.

The generator G1 inverses the pseudo-color double-stained hyperspectral image PsudoData (m, n, λ) to obtain a virtual color H&E stained image ColorData (m, n) by learning a training model of the color reference whole slide image ColorWSI (x, y).

The discriminator D1 converts the virtual color H&E stained image ColorData (m, n) into a 70×70 matrix, discriminates features of the color reference whole slide image ColorWSI (x,y), and outputs a confidence between 0-1.

The generator D2 reversely learns a training model of the pseudo-color double-stained hyperspectral image PsudoData (m, n, λ), and then inverses the virtual color H&E stained image ColorData (m, n) to obtain a virtual double-stained hyperspectral image FakeData (m, n, λ).

The Discriminator D2 discriminates features of the virtual double-stained hyperspectral image FakeData (m, n, λ) and the pseudo-color double-stained hyperspectral image PsudoData (m, n, λ), and outputs a confidence between 0-1.

Through the above methods, hyperspectral cycle generative adversarial networks model based on spatial spectrum information are trained, and finally the virtual staining models StainModel (X), where the virtual staining models StainModel (X) invert three-dimensional double-stained hyperspectral images HyperData' (m, n, λ) into two-dimensional color reference stained images ColorData (m, n) are established, as shown in FIG. 2.

S4, establishing labeling information segmentation models based on the double-stained hyperspectral images:

S401, performing image segmentation processing on the double-stained hyperspectral images based on a gradient boosting decision tree and a graph cut algorithm to obtain a binary image of a tumor region of interest;

S402, obtaining labeling files required by the pathological data set by extracting an outer contour of the binary image, and completing establishing the labeling information segmentation models.

Figure 3:
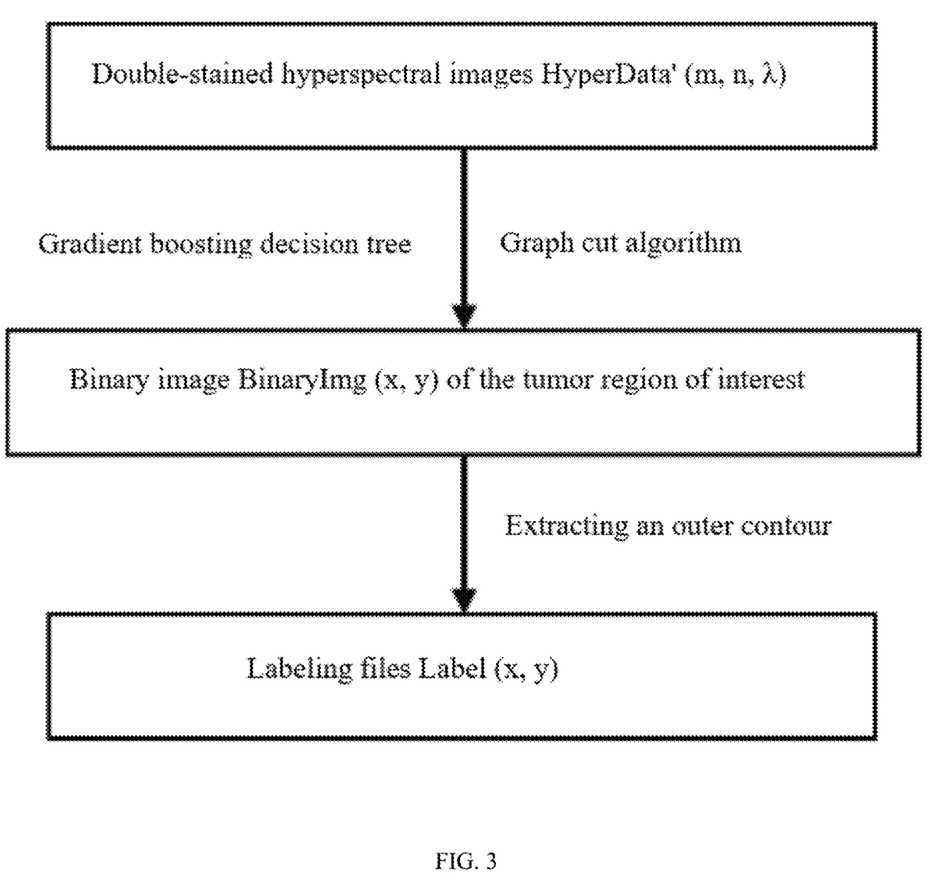
FIG. 3 is a flow chart of segmenting generated label files according to an embodiment of the present application.
Figure 4:
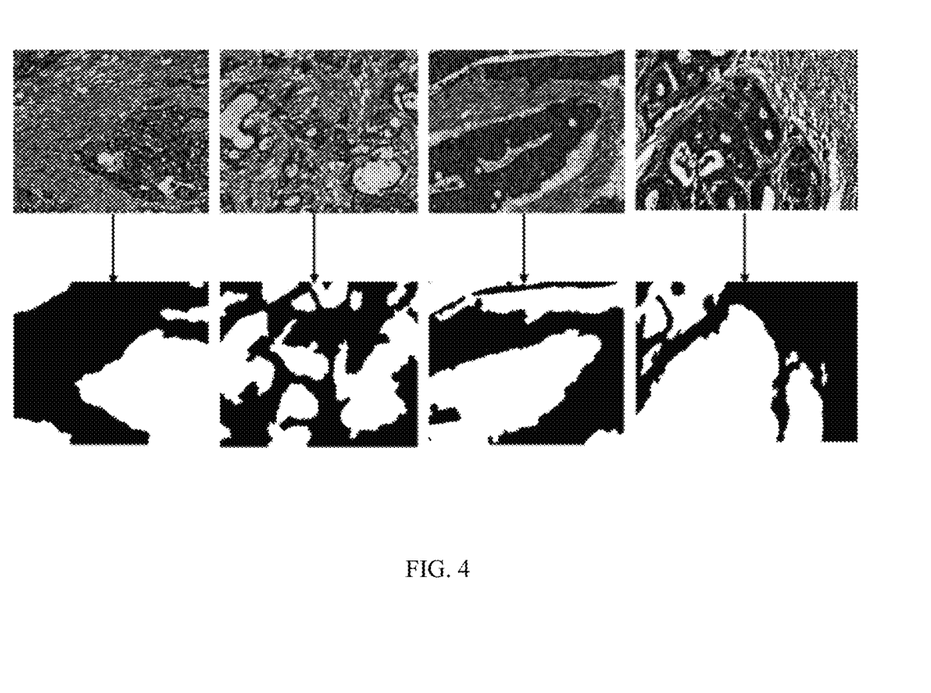
FIG. 4 is a schematic diagram of labeling binarization result of tumor region of interest according to an embodiment of the present application.

Further, in this embodiment, above steps as shown in FIG. 3 are specifically as follows:

by using the gradient boosting decision tree method, inputting the three-dimensional double-stained hyperspectral data HyperData' (m, n, λ) into the decision tree based on spectral information for image segmentation, and obtaining a preliminary segmentation result SegmentImg (x,y);

using the preliminary segmentation result SegmentImg (x, y) as a mask, and inputting the preliminary segmentation result SegmentImg (x, y) and the pseudo-color composite images PsudoData (m, n, λ) together into the graph cut algorithm based on morphological information to optimize a segmentation result, and obtaining the binary image BinaryImg (x, y) of the tumor region of interest, as shown in FIG. 4;

by extracting the outer contour of binary image BinaryImg (x, y) of tumor region, obtaining the labeling files Label (x, y) required by the pathological data sets, and finally establishing a segmentation model AutoLabel (Y) for automatically generating labeling information.

Figure 5:
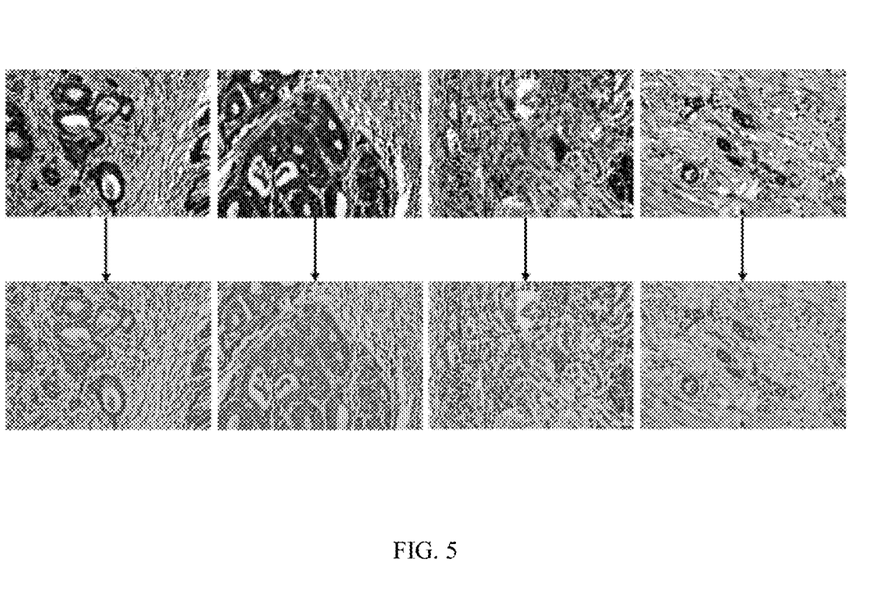
FIG. 5 is a schematic diagram of output result of virtual staining models according to an embodiment of the present application.

S5, obtaining the fine-labeled digital pathological data set based on the double-stained hyperspectral images and the virtual staining models, the double-stained hyperspectral images and the labeling information segmentation models:

Further, in this embodiment, above step is specifically as follows:

inputting a large-scale untrained double-stained hyperspectral images HyperData' (m, n, λ) into the established virtual staining models StainModel (X), and outputting the color reference H&E stained image ColorData' (m, n) by the model, as shown in FIG. 5;

inputting a large-scale double-stained hyperspectral images HyperData' (m, n, λ) synchronously to the segmentation model AutoLabel (Y), and outputting the corresponding labeling information Label' (x, y) by the model.

The color reference H&E stained image ColorData' (m, n) and the corresponding labeling information Label' (x, y) as output result by the two models, jointly construct one digital pathological data set Dataset with fine labeling information.

What is claimed is:

1. An automatic generation method of a fine-labeled digital pathological data set based on hyperspectral imaging, comprising following steps:
   obtaining reference histological stained slides and double-stained slides based on pathological samples;
   obtaining two-dimensional color reference whole slide images based on the reference histological stained slides, and obtaining double-stained hyperspectral images based on the double-stained slides;
   establishing virtual staining models based on the two-dimensional color reference whole slide images and the double-stained hyperspectral images;
   establishing labeling information segmentation models based on the double-stained hyperspectral images; and
   obtaining the fine-labeled digital pathological data set based on the double-stained hyperspectral images and the virtual staining models, and the double-stained hyperspectral images and the labeling information segmentation models,
   wherein establishing the virtual staining models comprises following steps:
   establishing hyperspectral cycle generative adversarial networks;
   obtaining pseudo-color composite images based on the double-stained hyperspectral images;
   training the hyperspectral cycle generative adversarial networks based on the two-dimensional color reference whole slide images and the pseudo-color composite images to obtain the virtual staining models;
   wherein the hyperspectral cycle generative adversarial networks comprise two generators and two discriminators;
   the two generators are provided with encoders, transcoders and decoders;
   the encoders comprise three downsampling layers, the transcoders comprise nine residual blocks, and the decoders comprise three upsampling layers;
   the two discriminators each comprise a plurality of downsampling layers;
   wherein establishing the labeling information segmentation models comprises following steps:
   performing image segmentation processing on the double-stained hyperspectral images based on a gradient boosting decision tree and a graph cut algorithm to obtain a binary image of a tumor region of interest;
   obtaining labeling files required by the fine-labeled digital pathological data set by extracting an outer contour of the binary image, and completing establishing the labeling information segmentation models;
   wherein obtaining the fine-labeled digital pathological data set comprises following steps:
   inputting the double-stained hyperspectral images into the virtual staining model to obtain a color reference stained image;
   inputting the double-stained hyperspectral image into the labeling information segmentation models to obtain labeling information;
   forming the fine-labeled digital pathological data set based on the color reference stained image and the labeling information.

2. The automatic generation method of a fine-labeled digital pathological data set based on hyperspectral imaging according to claim 1, wherein obtaining the reference histological stained slides and the double-stained slides comprises following steps:
   obtaining pathological slides based on the pathological samples;
   staining the pathological slides based on hematoxylin-eosin to obtain the reference histological stained slides;
   staining the pathological slides based on the hematoxylin-eosin and an immunohistochemical marker to obtain the double-stained slides.

3. The automatic generation method of a fine-labeled digital pathological data set based on hyperspectral imaging according to claim 1, wherein a way to obtain the two-dimensional color reference whole slide images is as follows:
   using a whole slide scanner to carry out a magnified field of view collection on the reference histological stained slides to obtain the two-dimensional color reference whole slide images.

4. The automatic generation method of a fine-labeled digital pathological data set based on hyperspectral imaging according to claim 1, wherein obtaining the double-stained hyperspectral images comprises following steps:
   obtaining three-dimensional microscopic hyperspectral images and blank hyperspectral images based on the double-stained slides;
   preprocessing the three-dimensional microscopic hyperspectral images and the blank hyperspectral images to obtain the double-stained hyperspectral images.

5. The automatic generation method of a fine-labeled digital pathological data set based on hyperspectral imaging according to claim 4, wherein a way to obtain the three-dimensional microscopic hyperspectral images and the blank hyperspectral images is as follows:
   using a hyperspectral microscope to carry out a magnified single-field of view collection on the double-stained slides, wherein images containing biological tissues are collected to obtain the three-dimensional microscopic hyperspectral images, and blank images without any biological tissue are collected to obtain the blank hyperspectral images.

6. The automatic generation method of a fine-labeled digital pathological data set based on hyperspectral imaging according to claim 4, wherein a way to preprocess the three-dimensional microscopic hyperspectral images and the blank hyperspectral images is as follows:
   performing a floating-point operation of division on the three-dimensional microscopic hyperspectral images and the blank hyperspectral images by using a spectral normalization method.

* * * * *